United States Patent [19]
Bressler et al.

[11] Patent Number: 5,435,960
[45] Date of Patent: Jul. 25, 1995

[54] METHOD OF MAKING MULTI-SEGMENT PLASTIC COMPONENTS

[75] Inventors: Ulrich Bressler, Manchester, N.H.; Michael Brümmer, Laudenbach, Germany

[73] Assignee: Freudenberg-NOK General Partnership, Plymouth, Mich.

[21] Appl. No.: 182,571

[22] Filed: Jan. 14, 1994

[51] Int. Cl.⁶ .............................................. B29C 33/52
[52] U.S. Cl. ...................... 264/221; 164/132; 249/62; 249/184; 264/317; 264/318
[58] Field of Search ....... 264/221, 317, 318, DIG. 44; 164/28, 132, 35; 249/62, 184

[56] References Cited

U.S. PATENT DOCUMENTS

| | | | |
|---|---|---|---|
| 4,871,505 | 10/1989 | Lapeyre | 249/184 |
| 4,958,675 | 9/1990 | Kidd | 164/120 |
| 5,173,237 | 12/1992 | Kidd | 264/221 |
| 5,257,922 | 11/1993 | Vansnick et al. | 264/317 |

FOREIGN PATENT DOCUMENTS

| | | | |
|---|---|---|---|
| 3530163 | 3/1987 | Germany | 164/28 |
| 61-252895 | 11/1986 | Japan | 264/317 |
| 1250476 | 10/1971 | United Kingdom | |
| 2197616 | 5/1988 | United Kingdom | 264/317 |

Primary Examiner—Jay H. Woo
Assistant Examiner—Robert B. Davis
Attorney, Agent, or Firm—Dinnin & Dunn

[57] ABSTRACT

A core ring assembly for use in production of a plastic injection-molded component is formed by injecting molten metal alloy into core dies to produce two intricately shaped ring type elements—one male, one female. Removing the male and female ring elements from the core dies and combining the two elements in an assembly machine to form a uniform, geometrically symmetrical, integral core ring assembly. The core ring assembly is transported to a plastic molding machine for overmolding the core ring assembly with either thermosetting or thermoplastic material. Then, the core assembly is melted out from the plastic component in a hot oil bath or induction melt-out, and the molten alloy recovered thereby is returned to a molten metal alloy tank for reuse.

7 Claims, 5 Drawing Sheets

METHOD OF MAKING MULTI-SEGMENT PLASTIC COMPONENTS

BACKGROUND OF THE INVENTION

1. Field of the Invention

The present invention relates to an integral melt-out metal core assembly for overmolding and production of molded plastic components. More specifically the present invention relates to forming several metallic rings into a core assembly for use in forming a plastic injection molded component; and in particular this invention is applicable to the manufacture of multi-blade plastic turbine rotors for automatic transmissions.

2. Description of the Related Art

Melt-out metal alloy parts of intricate complexities are made for overmolding with plastic to form plastic components that have internal or external undercuts and hollowed-out areas which could not be manufactured by known demolding techniques of state-of-the-art toolmaking principles. Melt-out alloy cores are used for manufacturing such products as: propellers, turbines, stators, pump wheels, impellers and other circular arrayed parts which have to be molded as a one piece construction, but have heavily overlapping blades or channels which make molding by conventional means impossible. One approach to developing a manufacturing process for use in making an injection molded plastic component such as a turbine is proposed in U.S. Pat. No. 5,173,237, which discloses use of a plurality of metallic core segments, typically one for each blade or vane, to form the required internal or external geometry of the finished plastic part. The single core segments are assembled into a ring shape prior to loading the core assembly into a mold mounted on a plastic molding machine. The prior art requires that each core segment be manually inserted into the core assembly or where feasible automates the assembly of the single segments by a robotic unit. It is both time consuming and very costly to have to first produce the relative high number of single core segments ranging typically from seven to thirty, and then to assemble the core segments into a ring shaped multiple core segment assembly. Furthermore, a significant tolerance build-up in the multiple core segment assembly leads inevitably to poor finished part quality due to dimensional inadequacies and poor surface finish caused by excessive flash from poor fitting segments of the core assembly. Thus, there is a need in the art for a method of making multi-segment plastic components which takes into consideration the need for high quality and dimensionally accurate parts, in a simple and efficient manner.

SUMMARY OF THE INVENTION

Accordingly, the present invention is a unique method and apparatus for injection molding a multi-segment plastic component. In general the method includes the use of a core ring assembly which is disposed and secured in a mold cavity by front and rear portions of the mold. The core ring assembly is formed of one or two female core rings having a plurality of inwardly extending core segments and one or two male core rings, having a plurality of outwardly extending core segments. The female and male core rings being complementary, such as that the male core ring may be inserted and locked into the female core ring to create a finished core ring assembly. The core ring assembly is placed into the mold cavity formed by the front and rear portions of the mold. Closure of the first and second mold portions locates and secures the core ring assembly in the proper position for molding. Plastic material injected into the mold cavity overmolds the core assembly to form the plastic component (e.g., a multi-bladed turbine rotor, or the like). The plastic component and overmolded core assembly are then removed from the mold and placed in a thermal bath to melt out the core assembly putting the plastic component in a finished final form.

One major advantage of the present invention is that it eliminates costs, with respect to production and time, in producing individual core element segments, including the time necessary to assemble the individual segments into a ring-shaped core. A further unique advantage of the present invention is that it eliminates the tolerance buildup occurring during the assembly of individual segments which leads to poor finished part quality and excessive flash during molding due to dimensional inadequacy and a poor fit between the old type of individual segments; i.e., the process eliminates any stack up of tolerances occurring during assembly of the core ring which are unavoidable when using the core assembly disclosed in the prior art.

Additionally, a further advantage is that the time necessary to produce a single or double male and female component of the core ring assembly is reduced, making it possible to reduce the number of mold cavities for making the core ring assemblies, which reduces the number of core molds necessary to keep pace with the cycle time of the plastic injection molding machine.

Other features and advantages of the present invention will be readily appreciated as the same becomes better understood, after reading the following description in conjunction with the accompanying drawings.

DESCRIPTION OF THE BEST MODE AND THE PREFERRED EMBODIMENT(S)

Figure 1:
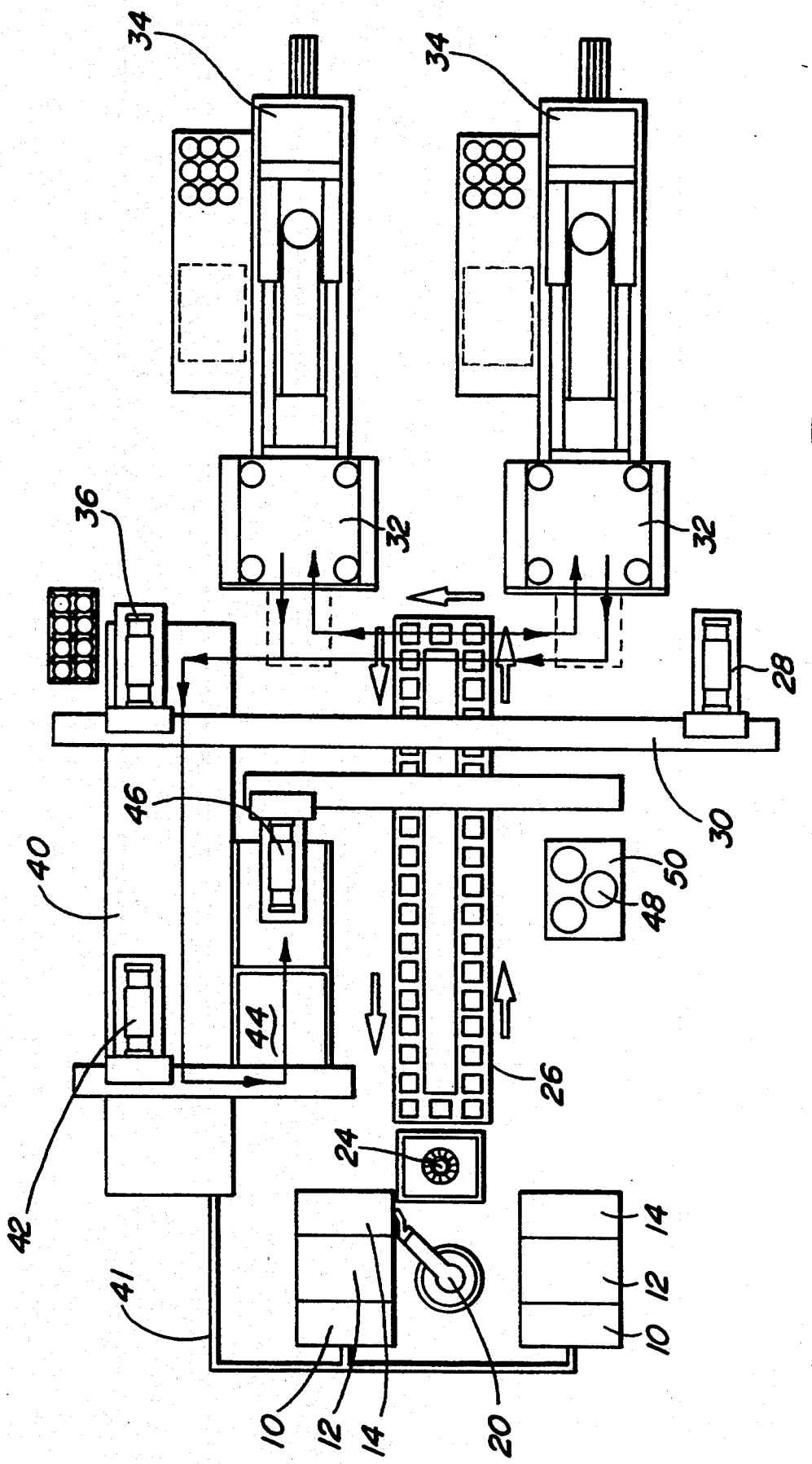
FIG. 1 is a schematic plan view of an apparatus for manufacturing a multi-segment plastic component according to the present invention.

Turning now to the drawings and more particularly to FIG. 1 a method of making a multi-segment plastic part through injection molding is shown. Throughout the drawings like numerals indicate like elements.

Referring to FIG. 1, a tank 10 contains an inventory of low melt temperature alloy in a molten state. A dispensing apparatus 12 forces an exact metered amount of molten alloy through two nozzles into a two cavity core die 14 used to form a male 16 and a female 18 core ring (see FIGS. 5A & 5B)—one nozzle for each cavity. In order to keep pace with the plastic injection molding machine 34, two cycles, i.e. two sets of male 16—female 18 core rings, have to be completed within approximately one minute. A robot 20 with six-axis capabilities removes the female ring 18 from the core die 14 and places it, circumferentially oriented, in an assembly fixture 22. Next, the robot 20 removes the remaining male ring 16 from the core die 14 and inserts it, using a rotating motion, into the female ring 18, locking them together and forming a complete core ring assembly 24. After finishing the assembly operation, a visual and dimensional inspection takes place. After inspection, a robot 20 places the complete core ring assembly 24 on a transfer system 26. At the end of the transfer system 26, a robot 28 with four axis capability, mounted on an independently running carriage system 30, loads the complete core ring assembly 24 into the rear portion 33 of a single (see FIG. 7) or multiple cavity mold 32 mounted on one of two plastic injection molding machines 34 for overmolding. Before this operation can take place, a finished overmolded part from the former machine cycle has to be removed by a part removal robot 36 which runs on the same carriage system 30 as the robot 28 used to load the core ring assembly 24. The part removal robot 36 would also carry and mount another insert such as a hub 70 (see FIG. 4) which is required in a part similar to a turbine (see FIGS. 3 & 4) or propeller. The complete core ring assembly 24, now overmolded with plastic, is delivered by the part removal robot 36 to a melt-out tank 40 with a thermal oil bath to reclaim all metal alloy from the core ring assembly 24. The oil temperature is just high enough to melt the alloy and leave all the plastic components untouched and intact.

The alloy of the molten core ring assemblies collects at the bottom of the melt-out tank 40 and is transferred, via piping 41, to the molten metal tank 10 for reuse enabling continuity in the production process. The finished plastic parts which were immersed in the thermal oil bath of the melt-out tank 40 have to be washed and rinsed. A transfer robot 42, transfers the parts into a wash/rinse tank 44. A second transfer robot 46 delivers the finished plastic product 48, such as a turbine, to a packaging and shipping area 50.

Figure 2:
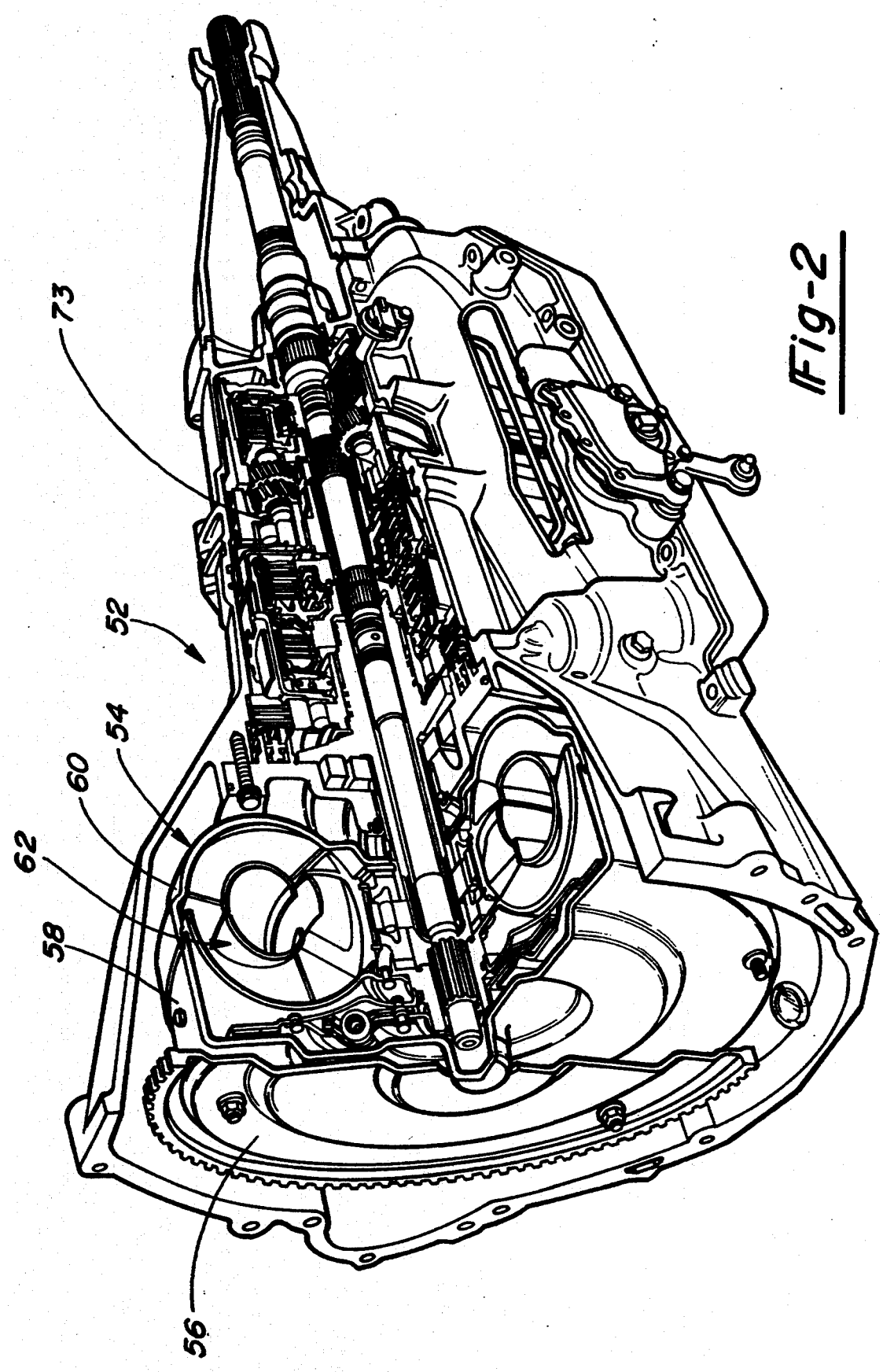
FIG. 2 is a prospective view of an automatic transmission with portions removed for clarity and illustrating a multi-segment plastic component, such as a turbine, which can be manufactured according to the present invention.

Referring now to FIG. 2, it should be appreciated that the above identified method for making a multi-segment plastic component can be used to make a turbine such as the type used in a automatic torque converter of an automatic transmission. FIG. 2 illustrates a typical automatic transmission 52 utilizing a torque converter 54. The automatic transmission 52 is used to transmit power from a rotating crank shaft (not shown), such as is found in an automobile engine, to a drive unit connected to one or more drive wheels. As illustrated in FIG. 2, power is transmitted from the rotating crank shaft to a fly wheel 56 and a converter housing 58 which are attached to an impeller 60 which rotates with the crank shaft. The impeller 60 is fluidly connected, in a toroidal flow relationship, in a known manner with a turbine 62 and a stator 64. The turbine 62 includes a plurality of circumference spaced turbine blades 66 which are connected to the interior of the turbine. The turbine shell 68 is secured to a turbine hub 70 (see FIG. 4) member which is drivingly connected, typically by a spline connection, to a rotatable input member or shaft 72 to which a gear assembly (seen generally at 73) of the transmission 52 is drivingly engaged.

It has been determined that turbines 62 for use in torque converters 54 manufactured out of a high strength, high temperature plastic provide a more efficient fluid flow versus metal, result in better fuel economy, create less noise and less vibration due to the light weight nature and high strength materials that the turbine is made from.

Figure 3:
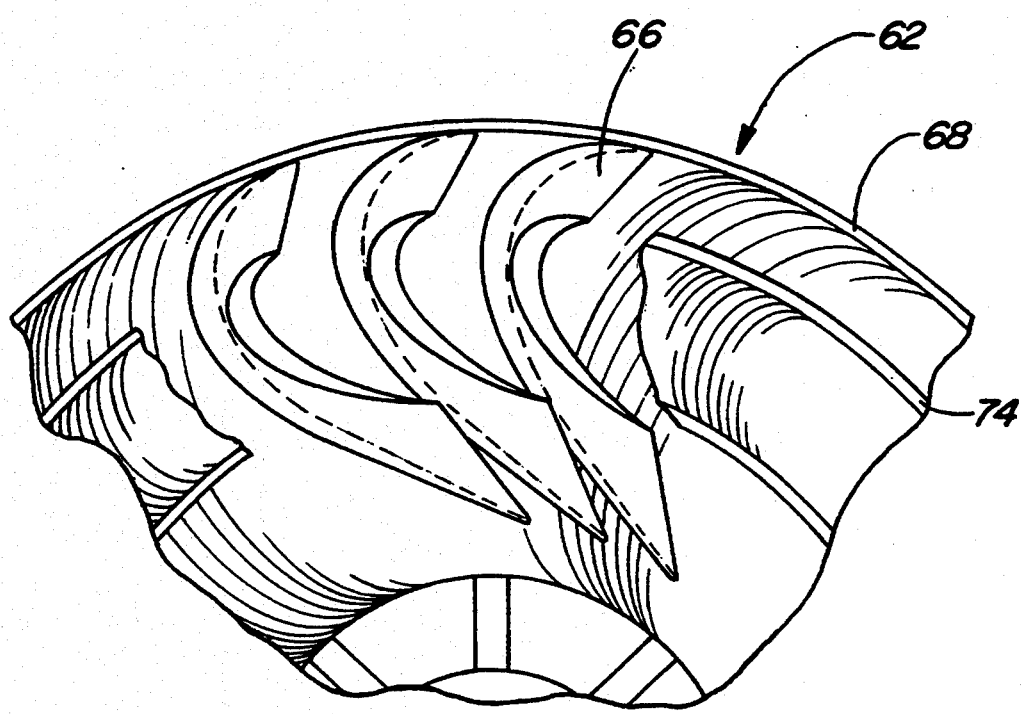
FIG. 3 is a partial plan view of the turbine of FIG. 2.
Figure 4:
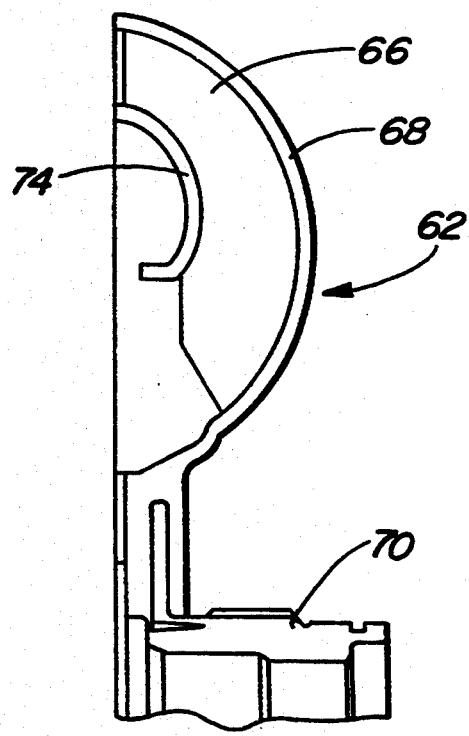
FIG. 4 is a partial side view of the turbine of FIG. 2.

Referring now to FIGS. 3 and 4 a turbine blade of the type used in an automatic transmission of a motor vehicle is shown. The turbine 62 comprises a plastic outer shell 68, a plastic inner shell 74 and a plurality of blades 66 interconnecting the outer 68 and inner 74 shells. Additionally, a hub member 70 is attached to the outer shell 68 through the molding process. The hub member 70 includes a splined interior bore for attachment to the input shaft 72. It should be appreciated that the overlap from blade to blade occurring as a result of the highly-curved air foil-shaped blade configuration defies any de-molding efforts by conventional plastic molding techniques. Therefore, the present invention which overmolds the turbine 62 on the core ring assembly 24 which is later removed from through a melt-out procedure allows sophisticated and intricate designs to be easily manufactured.

Prior art methods of making a core ring assembly for use in molding a plastic turbine blade, such as set forth in U.S. Pat. No. 5,173,237 cannot provide sufficient quantifies of the single elements (e.g. see elements 70 in FIGS. 2 and 3 of U.S. Pat. No. 5,173,237, the disclosure of which is incorporated herein by reference) to support and maintain the plastic molding machine cycle. Typical plastic injection molding machine cycles are approximately one minute. Additionally, it is difficult to assemble the high number of single cores (e.g. see elements 60 numbering from 18 through 30 of U.S. Pat. No. 5,173,237) to a precision complete core assembly which will meet quality expectations, flash and dimensional accuracy, for highly sensitive products such as a turbine rotor 62.

Figure 5B:
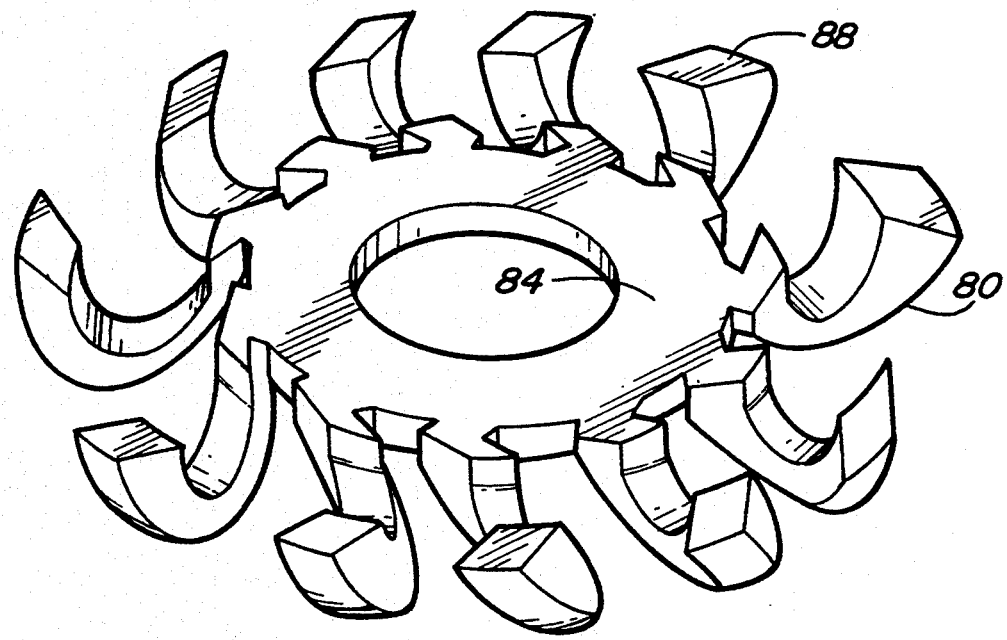
FIG. 5B is a perspective view of a female core ring according to the present invention.
Figure 5A:
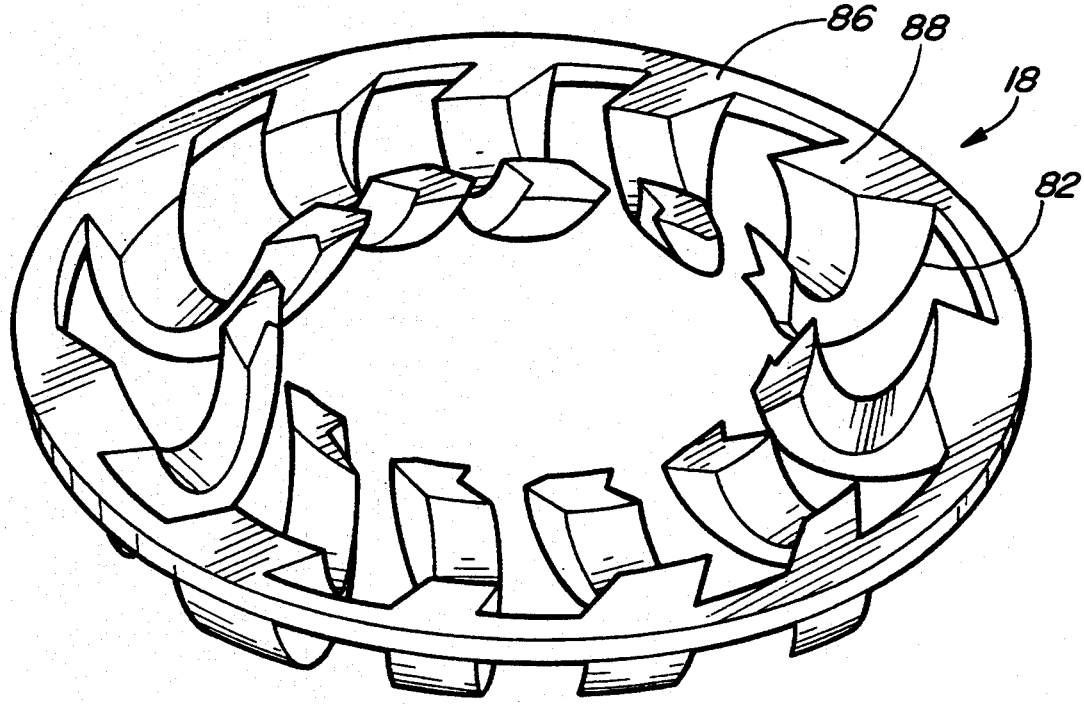
FIG. 5A is a perspective view of a male core ring according to the present invention.
Figure 6:
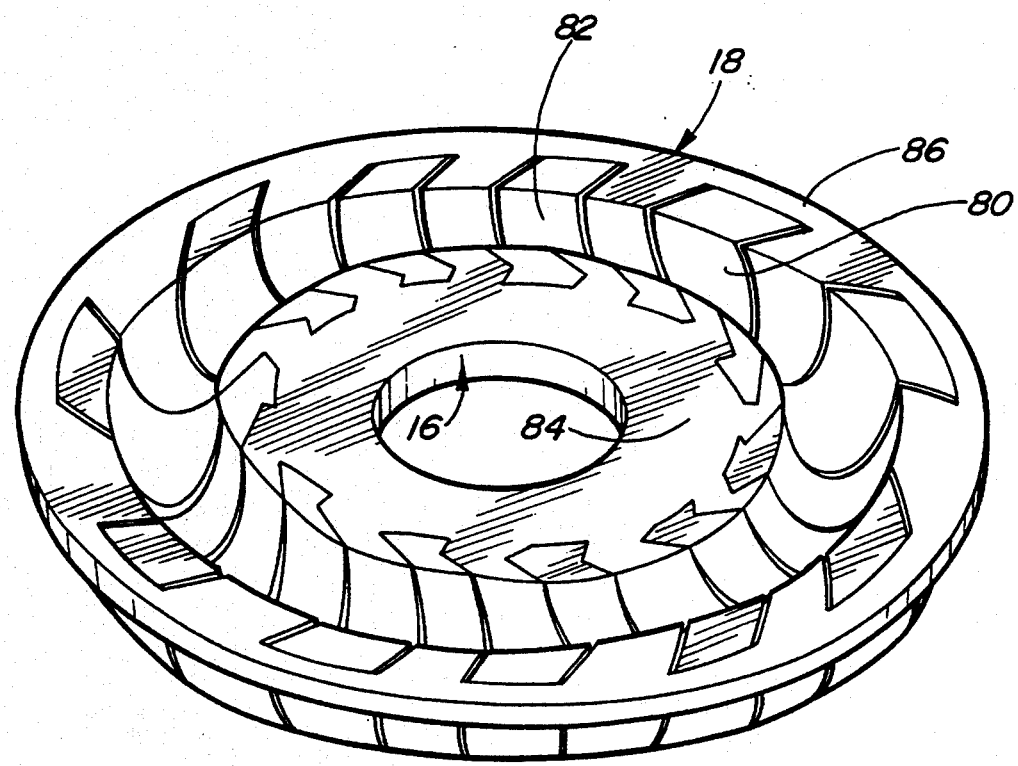
FIG. 6 is perspective view of the core ring assembly.

The present invention utilizes a core ring assembly 24 as illustrated in FIGS. 5A, 5B and 6. In this application, complete male 16 and female 18 core rings are made of low melt temperature alloys. The alloy rings have a high quality finish and a fine grain structure. Each male 16 and female 18 core ring carries a number of segments 80, 82 respectively, connected to inner 84 and outer 86 flanges in a double spacing arrangement equal to half the total number of blades required for the complete turbine 62. The individual male 16 and female 18 core rings can be molded to high precision because of zero shrinkage of the alloy during casting and are therefore also perfectly spaced. This process enables the segments 80, 82 of the male 16 and female 18 core rings to be molded with an accuracy equalling the original core mold 14.

Referring now to FIG. 6, a complete core ring assembly 24 is shown. Assembling the core ring assembly 24 assembly into this configuration i.e. inserting the male ring 16 into the female ring 18 and rotating the male ring 16 to lock it into the female ring 18, does not change the accurate position of each segment 80, 82 with respect to adjacent segments. To the contrary, assembly of the core ring assembly 24 in this manner eliminates the possibility of any stack-up tolerances which are inherent and unavoidable when using the former method of assembling the core assembly out of single segments. It should be appreciated that the cross section 88 for a core segment 80, 82 of the male 16 or femme 18 core ring is identical to the cross section of a single core element (No.s 18-30 of U.S. Pat. No. 5,173,237) and the cross section 88 determines the alloy molding cycles. Therefore, it takes basically the same time to produce one male 16 and female 18 core ring as it would take to produce a single core segment which later on has to be assembled together with a multiple of other core segments, typically seven to thirty, into a metallic core assembly. The time available to produce single or double male 16 or female 18 core rings is therefore significantly increased, typically by a factor of ten. This makes it possible to reduce the number of cavities to two, one for the male core ring 16 and one for the female core ring 18 thus simplifying the process and making it more efficient. Lacking a need for an application of the multiple core segment assembly process disclosed in the prior art relieves the pressure to produce an overwhelming amount of segments within a cycle dictated by the plastic molding machine, resulting in a comfortable and efficient process layout.

Figure 7:
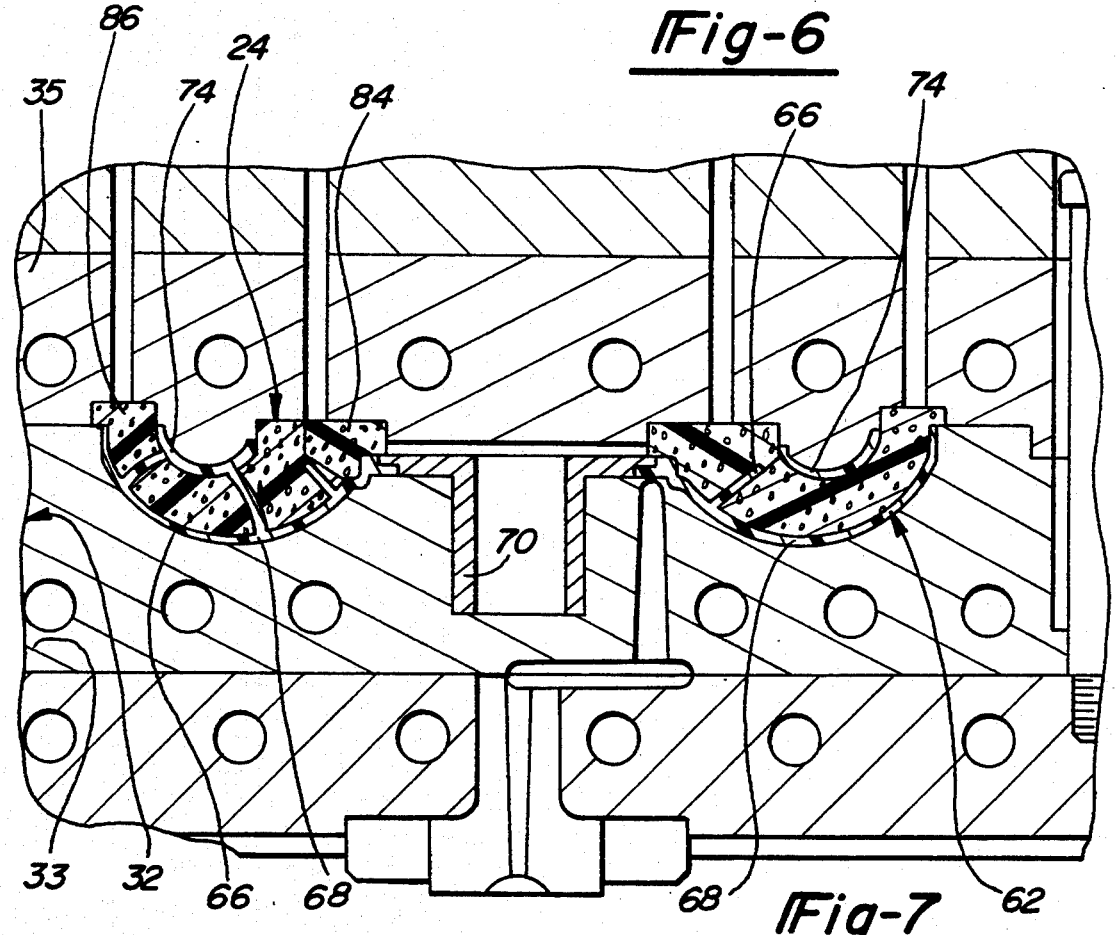
FIG. 7 is cross-section side view of a mold having a plastic turbine shown overmolded within a core ring assembly and disposed in the mold cavity.

Turning now to FIG. 7 a turbine 62 overmolded on a complete core ring assembly 24 in a mold 32 is shown. The turbine 62 includes a hub 70 supported in the mold 32 while the core ring assembly 24 is supported by sandwiching the outer flange 86 of the female core ring 18 and the inner flange 84 of the male core ring 16 between the from 33 and rear 35 portions of the mold 32. This arrangement enables the core ring assembly 24 to be accurately placed within the mold cavity, thereby, eliminating stack-up tolerances and poor finished part quality.

Various changes can be made to the embodiments shown herein without departing from the scope of the present invention which is limited only by the following claims.

What is claimed is:

1. A method of forming a molded plastic part through use of a metallic core over which the part is over molded comprising the steps of:

providing a machine for dispensing a molten metal alloy;

pumping said molten metal alloy into a male and female core die to form male and female core rings which enable the avoidance of improper tolerance build-ups;

assembling said male and female core rings together to form a core ring assembly;

loading said core ring assembly into a molding machine for over molding to form the part; and melting said core ring assembly out from the part and returning the molten metal alloy to the machine for dispensing the molten metal alloy.

2. A method as set forth in claim 1 including the step of unloading said female core ring and placing it in a fixture.

3. A method as set forth in claim 2 including the step of unloading said male core ring and inserting it into said female core ring in a rotating motion.

4. A method as set forth in claim 3 including the step of temperature conditioning said core ring assembly via a conveyor type oven.

5. A method as set forth in claim 4 including the step of loading a hub in said molding machine in combination with said core ring assembly.

6. A method of manufacturing a molded plastic component comprising the steps of:

forming a core ring assembly having a male core ring including a first flange and a plurality of core segments extending therefrom and a female core ring including a second flange and a plurality of core segments extending therefrom;

inserting said core ring assembly into a mold cavity, said mold cavity formed by a front and a rear portion, wherein closure of the front and rear portions sandwiches the first flange and second flange between the front and rear portions to secure the core ring assembly in place;

introducing plastic into the mold cavity and overmolding the core ring assembly;

removing the component and overmolded core ring assembly from the mold cavity; and melting said core ring assembly out from the finished component.

7. A method as set forth in claim 6 wherein said step of melting said core ring assembly includes the step of placing said component and core ring assembly in a thermal oil bath to melt-out the core ring assembly.

* * * * *

UNITED STATES PATENT AND TRADEMARK OFFICE
CERTIFICATE OF CORRECTION

PATENT NO. : 5,435,960
DATED : July 25, 1995
INVENTOR(S) : Ulrich Bressler and Michael Brummer It is certified that error appears in the above-indentified patent and that said Letters Patent is hereby corrected as shown below:

Column 4, line 30, "quantifies" should be -- quantities --;

Column 5, line 29, "from" should be -- front --.

Signed and Sealed this

Thirtieth Day of January, 1996

Attest:

BRUCE LEHMAN

Attesting Officer  Commissioner of Patents and Trademarks